United States Patent [19]

Lajovic

[11] 4,032,043
[45] June 28, 1977

[54] DISPENSING CONTAINER NECK THREAD PROTECTION

[75] Inventor: Dusan S. Lajovic, Smithfield, Australia

[73] Assignee: Colgate-Palmolive Company, New York, N.Y.

[22] Filed: Feb. 5, 1973

[21] Appl. No.: 329,399

Related U.S. Application Data

[63] Continuation of Ser. No. 75,840, Sept. 28, 1970, abandoned.

[30] Foreign Application Priority Data

Oct. 2, 1969 Australia .................... 61800/69

[52] U.S. Cl. .................................... 222/92; 215/31
[51] Int. Cl.² ........................................ B65D 35/08
[58] Field of Search ................ 215/31, 246, 329; 222/92

[56] References Cited

UNITED STATES PATENTS

| | | | |
|---|---|---|---|
| 2,376,909 | 5/1945 | Ford | 215/31 |
| 2,794,574 | 6/1957 | McGeorge et al. | 222/92 |
| 2,871,130 | 1/1959 | Holman | 215/31 X |
| 3,397,821 | 8/1968 | Tiberiis | 222/92 |

FOREIGN PATENTS OR APPLICATIONS 678,389  1/1964  Canada ......................... 215/31

Primary Examiner—Robert B. Reeves
Assistant Examiner—Joseph J. Rolla
Attorney, Agent, or Firm—Strauch, Nolan, Neale, Nies and Kurz

[57] ABSTRACT

A plastic insert is formed around the externally threaded dispensing neck of a metal toothpaste or like tube by positioning a collar section of heat shrinkable plastic material around the neck in the presence of heat sufficient to shrink the material upon and within the threads, and the internally threaded end closure for the tube is rotatably mounted on the neck whereby the collar is tightly secured on the neck and conformed to the matching threaded contour of the neck and closure.

12 Claims, 5 Drawing Figures

INVENTOR
DUSAN S. LAJOVIC

BY Strauch, Nolan, Neale, Nies & Kurz
ATTORNEYS

DISPENSING CONTAINER NECK THREAD PROTECTION

This is a continuation of application Ser. No. 75,840, filed Sept. 28, 1970, now abandoned.

This invention relates to methods of inserting plastic or other inserts in screw threads, particularly at the externally screw threaded dispensing necks of toothpaste and like tubes, and the resultant articles.

The herein disclosed method is claimed in U.S. Pat. No. 3,906,070 issued Sept. 16, 1975 for Method of Protectively Covering Metal Threads from application Ser. No. 295,538 which was filed Oct. 6, 1972 as a division of said Ser. No. 75,840 filed Sept. 28, 1970.

In the manufacture of flexible tubes such as aluminum or aluminum alloy toothpaste tubes, it is customary to form upon one end a rigid reduced diameter dispensing neck having an external screw thread adapted to removably mount an internally threaded closure cap. Where the contents of the tube are substances containing abrasive particles such as toothpaste, any paste at or near the exit orifice of the neck tends to become discoloured as it spreads onto and abrades the exposed aluminum surface of said neck, especially when said cap is removed and reinstalled a number of times during use of the tube contents.

In attempts to overcome the above-mentioned problem, it has been proposed to install upon a knurled or other roughened outer surface of the metal neck an enveloping plastic sleeve which is moulded in situ and provided with an inwardly turned lip at the outer extremity thereof so as to cover the erstwhile outer lip of the metal neck. Upon the outer surface of that plastic sleeve a suitable screw thread is formed during the moulding operation, and an internally threaded cap (usually larger than standard) may then be installed thereon. Examples of this attempt to solve the problem are disclosed in McGeorge et al. U.S. Pat. No. 2,794,594 filed 1952 and Tiberiis U.S. Pat. No. 3,397,821 filed 1966.

A disadvantage of this proposed arrangement is that the exit orifice of the plastic sleeve is usually reduced in area and thereby restricts the normal passage of paste. Furthermore, the sleeve moulding process is expensive, and the external thread formed on the plastic sleeve is insufficiently supported, and hence the coacting cap tends to strip off.

It is a major object of the present invention to overcome the foregoing disadvantages and other by providing a novel method of protectively covering screw threads of a metal article, such as the screw threaded neck of a toothpaste tube or the like, with a fixed thin covering of a heat shrinkable plastic such as polyvinyl chloride, and the novel article produced by the method. Pursuant to this object the method is preferably accomplished at the point in manufacture of the tube after it has been coated and printed on its external surface and has emerged hot from a coating and ink drying oven, the retained heat being sufficient to shrink the plastic covering upon and into the threads. It is however within the scope of the invention to apply added or even all heat necessary for the shrinking action from an external source.

It is a further object of the invention, in accordance with a preferred embodiment, to provide a novel method of installing a covering insert in an external screw thread formed in the metal neck of a toothpaste tube or the like, which method comprises the steps of feeding onto said neck a collar of flexible sheet plastic material of sufficient length to cover said thread and also project outwardly somewhat beyond the free end of said neck, the tube neck being sufficiently hot or heated to cause shrinking of the collar about the threads, and then rotatably fitting an internally threaded device such as the plastic closure cap for the tube over said tube neck, thereby tightly forming the plastic collar into full conformity with the neck threads and displacing the outer edge of the plastic collar over and sometimes within the lip of said neck. The collar may be severed from a length of plastic tubing. Upon allowing the confined warm plastic material to cool, the formed insert then assumes sufficient rigidity to protect the metal surface and is also adequately supported and stabilized by the metal structure lying beneath it.

Apparatus constructed in accordance with the invention may be formed without the use of expensive moulding equipment such as dies. In addition, the inserts may be formed from relatively small quantities of plastic sheet material in comparison with the amounts necessary to mould solid rigid sleeves. Furthermore, the plastic caps accurately fit the necks since they aid in forming the thread covering.

PREFERRED EMBODIMENT

Figure 1:
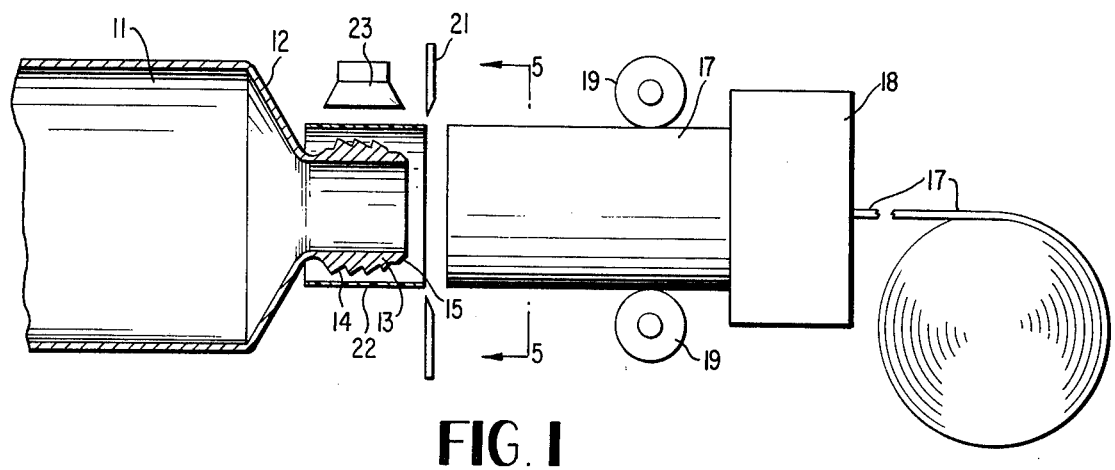
FIG. 1 is a partially diagrammatic partly sectional side view showing the method according to a preferred embodiment.

Referring to the drawings, a conventional empty toothpaste tube body 11 has a shouldered end 12 terminating in a rigid hollow dispensing neck 13. The tube is preferably an integral metal element, usually aluminum or an aluminum alloy. The neck is externally screw threaded at 14 in a conventional manner and the open end is surrounded by an axially outwardly facing lip 15. Since these threads are usually formed in a molding operation, the invention requires no departure from known methods of making such tubes. While neck 13 is shown as formed with a plurality of threads 14, the invention is applicable to a tube neck having only one or any number of threads for mounting the closure.

It is conventional, in the packaging of toothpaste for example, to form the complete empty tube and then attach a removable closure to the threaded neck, leaving the so-called bottom end open for filling and then crimping to complete the enclosure. It is also conventional practice to externally coat and print the empty tube and pass it through a drying oven before attaching the closure. When the tube emerges from the oven it is usually quite hot, and it is an important phase of the invention in the preferred embodiment to utilize this retained heat in attaching a plastic covering to the threaded neck of the tube before mounting the closure.

Figure 5:
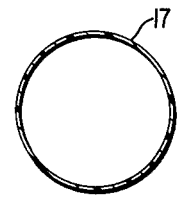
FIG. 5 is a section on line 5—5 of FIG. 1.

As shown diagrammatically in FIG. 1, a coil 16 of thin-walled hollow plastic tubing 17 in flat condition feeds into a device 18 wherein the tube is opened to the tubular hollow condition shown in FIG. 5. Tubing 17 is advanced as by intermittent feed rollers 19 until the leading end extends in surrounding relation over the threaded tube neck 13. At the time according to a preferred embodiment tube 11 is mounted on a conveyor (not shown) having just emerged from the drying oven so that the metal of the tube is hot.

Feed of tubing 17 stops after a predetermined length has been advanced, and then a knife or like severing unit indicated at 21 is actuated to cut off the leading end section of tubing 17. This severed section is shown in FIG. 1 as a separate collar 22 surrounding the neck threads. It will be noted that the axial length of severed collar 22 is such that its outer end extends outwardly beyond lip 15, for a purpose to appear.

Heat is applied to collar 22, and it immediately shrinks to a reduced diameter and length upon and around tube neck 13. Where the tube 11 is already heated, as in the preferred embodiment, the shrinking action may have started or even completed to some extent by the time knife 21 severs the collar. Where the tube 11 is unheated, a heating device such as electrical hot air heater 23 may be disposed to cause shrinking of collar 22. Where tube 11 may have been heated but has cooled down somewhat, the heater 23 may be relied upon for auxiliary heat. In any event heat is provided at this point sufficient to shrink the particular material of the collar 22 upon the threaded tube neck.

Figure 2:
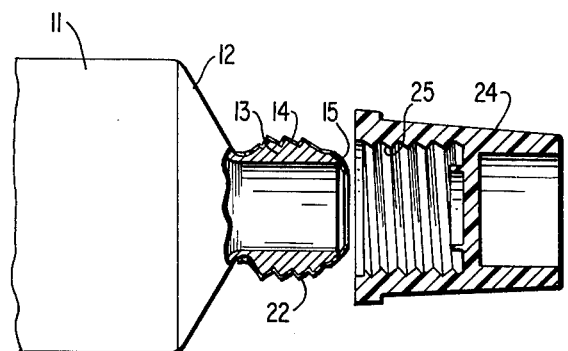
FIG. 2 is a fragmentary sectional side view illustrating the tube, insert and closure disposition and structure involved in a phase of the method.
Figure 3:
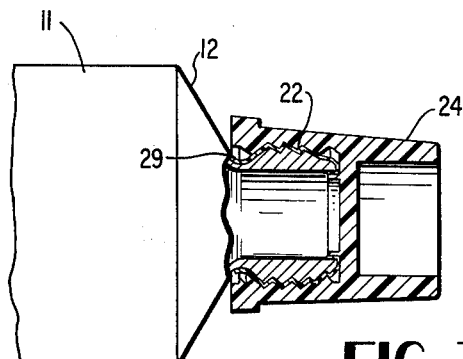
FIG. 3 is a fragmentary side view in section similar to FIG. 2 showing the closure in position after having completed conformation of the heat shrunk film to the threads.
Figure 4:
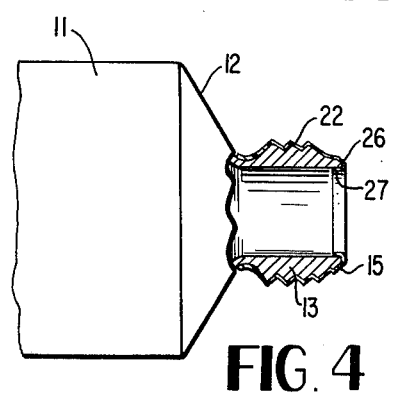
FIG. 4 is a fragmentary side view in section showing the covered neck thread section of the tube with the closure removed.

Now the usual rigid internally threaded molded plastic closure cap 24 is applied preferably while the collar 22, which has now mainly assumed the contour of the threads 14, remains relatively soft and warm. As shown in FIGS. 2 and 3, the internal threads 25 of closure 24 interfit with the covered threads 14 as the closure moves to final position on the tube neck 13, and the confined collar 22 is plastically deformed by the mechanical forces of the interacting threads 14 and 25 so that collar 22 is shaped to conform internally and externally to the threads. Also, see FIGS. 3 and 4, the outer annular portion 26 of collar 22 is deflected inwardly to closely overlie lip 15 and preferably a slight distance inwardly of the tube neck bore as shown at 27.

Once the closure is turned to tight position, the formed collar 22 cools in situ, providing a very tight substantially permanent coextensive covering upon the threaded tube neck. The process is continuous, the collar being installed and heat shrunk at one station (FIG. 1), and the closure applied when the tube is shifted by the conveyor to another station (FIG. 2). It is within the scope of the invention to provide and feed precut individual length collars 22 onto the tube neck at the first station, but the continuous length is preferred for production.

After the tube has been filled with toothpaste eventual users remove and reinstall the closure again and again without the abrasive toothpaste ever contacting the metal threads, so that a clean condition and appearance is retained.

It may be desirable to slightly undercut the tube neck or similarly form the inner end of the threads 14, as indicated at 29, so that a region of minimum external diameter is provided at that area wherein the collar 22 shrinks to close conformance, and this provides an effective axial anchor resisting axial displacement of the formed collar when the closure is applied or removed.

In actual practice, standard neck thread aluminum or like light metal tubes may be used, as well as standard thread molded plastic closure caps. Since the installed collar 22 as shrunk upon neck 13 is only a few mils in wall thickness, and since it is effectively resiliently deformable to conform to both threads 14 and 25, it provides an improved seal at the closure. Moreover, the plastic covering of threads 14 provides a smoother easier turning action for applying and removing the closure. The plastic of tubing 17 is preferably white for optimum appearance.

The tubing 17 may be any suitable heat shrinkable plastic. The preferable material is a polyvinylchloride film capable of providing collar sections of the requisite size slipping quickly over the threaded tube neck. Other examples of heat shrinkable film materials are polyester, polyethylene, polypropylene, polyvinylidene and pliofilm. Other heat shrinkable materials are disclosed in U.S. Pat. No. 2,452,607.

In a modification of the invention, suitable feeding means may be arranged to slide intermittently the open end of a coiled supply tube of said plastic material into its initial position upon said neck, and the means for severing the short sections of the installed tube just beyond the outer edge of the lip of said neck may be coordinated with suitable means which sweep a particular toothpaste tube so treated to another position wherein the cap-installing process may then take place. Meanwhile, the supply tube may be withdrawn slightly to permit another said toothpaste tube to be brought into the position just vacated by the first of said tubes, and so on in a substantially continuous process, as, for example, in a conventional capping machine.

I claim:

1. A dispensing tube assembly containing a fluent substance containing abrasive material comprising a collapsible metal body formed integrally at one end with a stiff shoulder terminating in a relatively rigid reduced diameter hollow discharge nozzle having an externally threaded section, an internally threaded closure cap for mounting on said nozzle and means for protecting said metal neck threads against abrasion by the substance contained in the body as the cap is repeatedly removed and replaced during successive discharges of portions of said substance in use of the assembly comprising a thin-walled smooth surfaced covering consisting of an integral heat shrunk element of non-metallic synthetic plastic material tightly permanently mounted and anchored against axial displacement on said nozzle in close internal and external contour following conformance with said threaded section, said nozzle being formed intermediate the shoulder and said threaded section with an annular anchor section distinct from the threaded section, the inner end of said element surrounding said annular section in snug internal and external contour following conformance and thereby anchoring said element against axial displacement on said nozzle when said threaded closure cap is rotatably applied upon or removed from said nozzle threads, said covering of plastic material resulting in only an immaterial increase in diameter of said threaded nozzle section thereby not requiring a larger closure cap than did the initial metal threaded section, and said covered threaded section providing a composite threaded region having a smooth abrasion protected thread surface stabilized and directly internally supported by the metal threads of the nozzle.

2. The dispensing tube assembly defined in claim 1, wherein said element is an integral collar of said plastic material with its axially outer end terminating in an annulus extending over the axially facing end lip of said nozzle.

3. The dispensing tube assembly defined in claim 1, wherein said element is an integral collar of a material selected from the group consisting of heat shrinkable polyesters, polyvinylchloride, polyethylene, polypropylene, polyvinylidene, and rubber hydrochloride.

4. The dispensing tube assembly defined in claim 1, wherein said tube body is composed of aluminum and said element is an integral collar of polyvinylchloride of film thickness.

5. A dispensing tube assembly containing a fluent substance containing abrasive material comprising a flexible body provided at one end with a shoulder terminating in a relatively rigid reduced diameter hollow metal discharge nozzle having an externally threaded section, an internally threaded removable closure cap for mounting on said nozzle, and means for protecting said metal neck threads against abrasion by the substance contained in the body as the cap is repeatedly removed and replaced in successive discharges of portions of said substance in use of the assembly comprising a thin-walled smooth surfaced covering consisting of an integral heat shrunk element of non-metallic synthetic plastic material tightly permanently mounted and anchored against axial displacement on said nozzle in close internal and external contour following conformance with said threaded section, said nozzle being formed adjacent the inner end of said threaded section with an annular recessed element anchoring section distinct from and discontinuous with respect to said threaded section, and said heat shrunk element adjacent one end surrounding and being disposed within said annular recessed section in snug internal and external contour following conformance to prevent rotation and axial displacement of said element on said nozzle when said threaded closure cap is rotatably applied to or removed from said nozzle threads, said covering of plastic material resulting in only an immaterial increase in diameter of said threaded nozzle section thereby not requiring a larger closure cap than did the initial metal threaded section, and said covered threaded section providing a composite threaded region having a smooth abrasion protected thread surface stabilized and directly internally supported by the metal threads of the nozzle.

6. The dispensing tube assembly defined in claim 5, wherein said heat shrunk element is an integral collar of said plastic material with its axially outer end terminating in an annulus extending over the axially facing end lip of said nozzle.

7. The dispensing tube assembly defined in claim 5, wherein said heat shrunk element is an integral collar of a material selected from the group consisting of heat shrinkable polyesters, polyvinychloride, polyethylene, polypropylene, polyvinylidene, and rubber hydrochloride.

8. The dispensing tube assembly defined in claim 5, wherein said tube body is composed of aluminum and said heat shrunk element is an integral collar of polyvinylchloride of film thickness.

9. A dispensing tube assembly containing a fluent substance containing abrasive material comprising a flexible metal body provided at one end with a shoulder having projecting therefrom a relatively rigid reduced diameter integral hollow metal discharge nozzle having an externally threaded section, an internally threaded removable closure cap for mounting on said nozzle, and means for protecting said metal neck threads against abrasion by the substance contained in the body as the cap is repeatedly removed and replaced during successive discharges of portions of said substance in use of the assembly comprising a thin-walled smooth surfaced covering consisting essentially of an integral heat shrunk abrasion resistant annular element of non-metallic synthetic plastic tightly permanently mounted and anchored against axial displacement on said nozzle in close internal and external contour following conformance with said threaded section, said nozzle being formed in an area located between said threaded section and the shoulder with recess means distinct from said threaded section coacting with a heat shrunk annular portion of said element in snug internal and external contour following conformance to prevent rotation and axial displacement of said element on said nozzle when said threaded closure cap is rotatably applied upon or removed from said nozzle threads, said covering of plastic material resulting in only an immaterial increase in diameter of said threaded nozzle section thereby not requiring a larger closure cap than did the initial metal threaded section, and said covered threaded section providing a composite threaded region having a smooth abrasion protected thread surface stabilized and directly internally supported by the metal threads of the nozzle.

10. The dispensing tube assembly defined in claim 9, wherein the portion of said element overlying said threaded section is closely conformed to a permanent position snugly following the contour of both the nozzle and cap threads when said cap is first threadedly mounted on said nozzle.

11. The dispensing tube defined in claim 10, wherein said nozzle terminates in an axially facing lip at its outer end and said element extends inwardly at that end to closely overlie said lip.

12. A dispensing tube assembly containing a fluent substance containing abrasive material comprising a flexible metal body formed integrally at one end with a shoulder terminating in a relatively rigid reduced diameter integral hollow discharge nozzle having an externally threaded section, an internally threaded removable closure cap for mounting on said nozzle, and means for protecting said metal neck threads against abrasion by the substance contained in the body as the cap is repeatedly removed and replaced in successive discharges of portions of said substance in use of the assembly comprising a thin-walled smooth surfaced covering consisting of an integral element of non-metallic synthetic plastic material tightly permanently mounted and anchored against axial displacement on said nozzle in close internal and external contour following conformance with said threaded section, said nozzle being formed adjacent the juncture of the shoulder and said threaded section with an undercut covering element anchoring region providing an annular section of smaller diameter than the threaded section, and said element surrounding said annular section in snug internal and external contour following conformance, said covering of plastic material resulting in only an immaterial increase in diameter of said threaded nozzle section thereby not requiring a larger closure cap than did the initial metal threaded section, and said covered threaded section providing a composite threaded region having a smooth abrasion protected thread surface stabilized and directly internally supported by the metal threads of the nozzle.

* * * * *